No. 725,528. PATENTED APR. 14, 1903.
W. A. WHITING.
SPEED REGULATOR FOR OIL ENGINES.
APPLICATION FILED FEB. 17, 1902.
NO MODEL. 5 SHEETS—SHEET 1.

Witnesses
Geo. E. Frech.
Chas. P. Wright Jr.

Inventor
W. A. Whiting,
By A. S. Pattison,
Attorney

No. 725,528. PATENTED APR. 14, 1903.
W. A. WHITING.
SPEED REGULATOR FOR OIL ENGINES.
APPLICATION FILED FEB. 17, 1902.
NO MODEL. 5 SHEETS—SHEET 2.
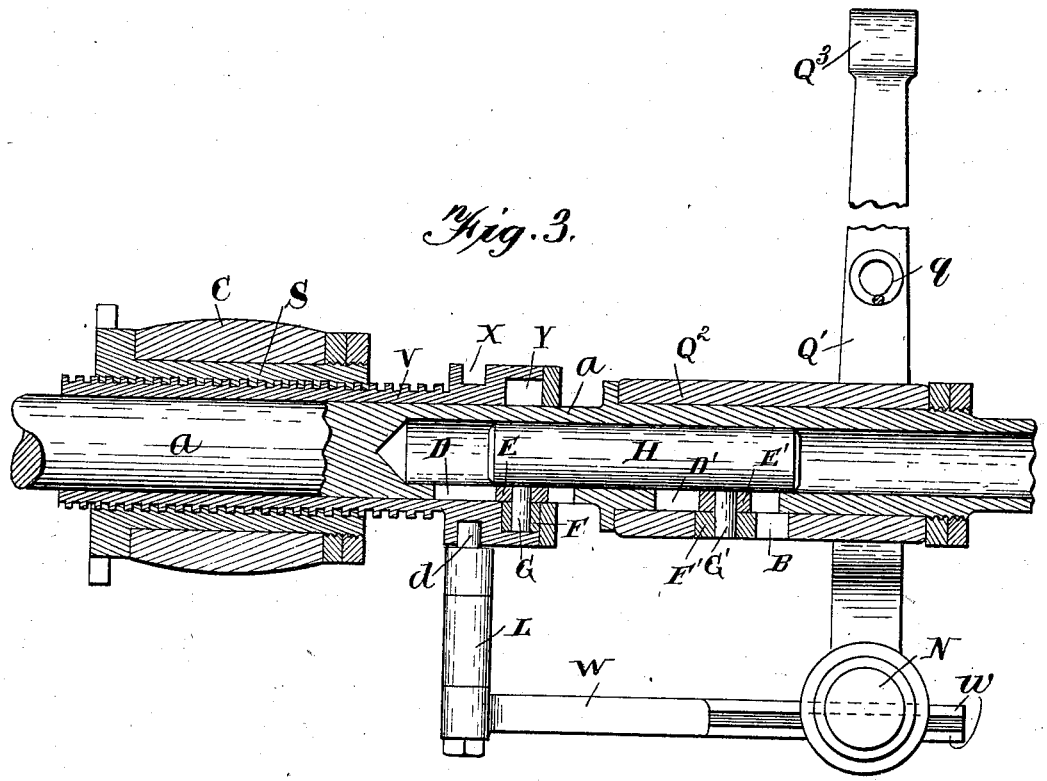
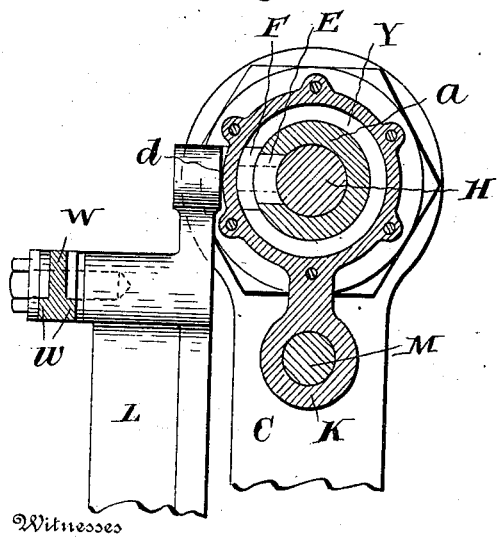
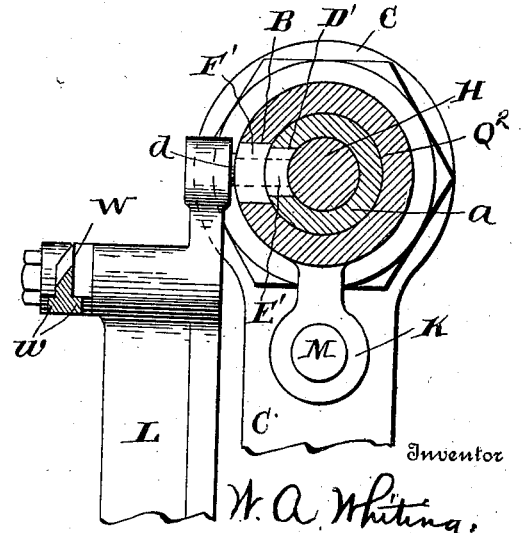
Witnesses
Geo. E. Frech.
Chas. P. Knight Jr.
Inventor
W. A. Whiting,
By A. S. Pattison
Attorney No. 725,528. PATENTED APR. 14, 1903.
W. A. WHITING.
SPEED REGULATOR FOR OIL ENGINES.
APPLICATION FILED FEB. 17, 1902.
NO MODEL. 5 SHEETS—SHEET 3.
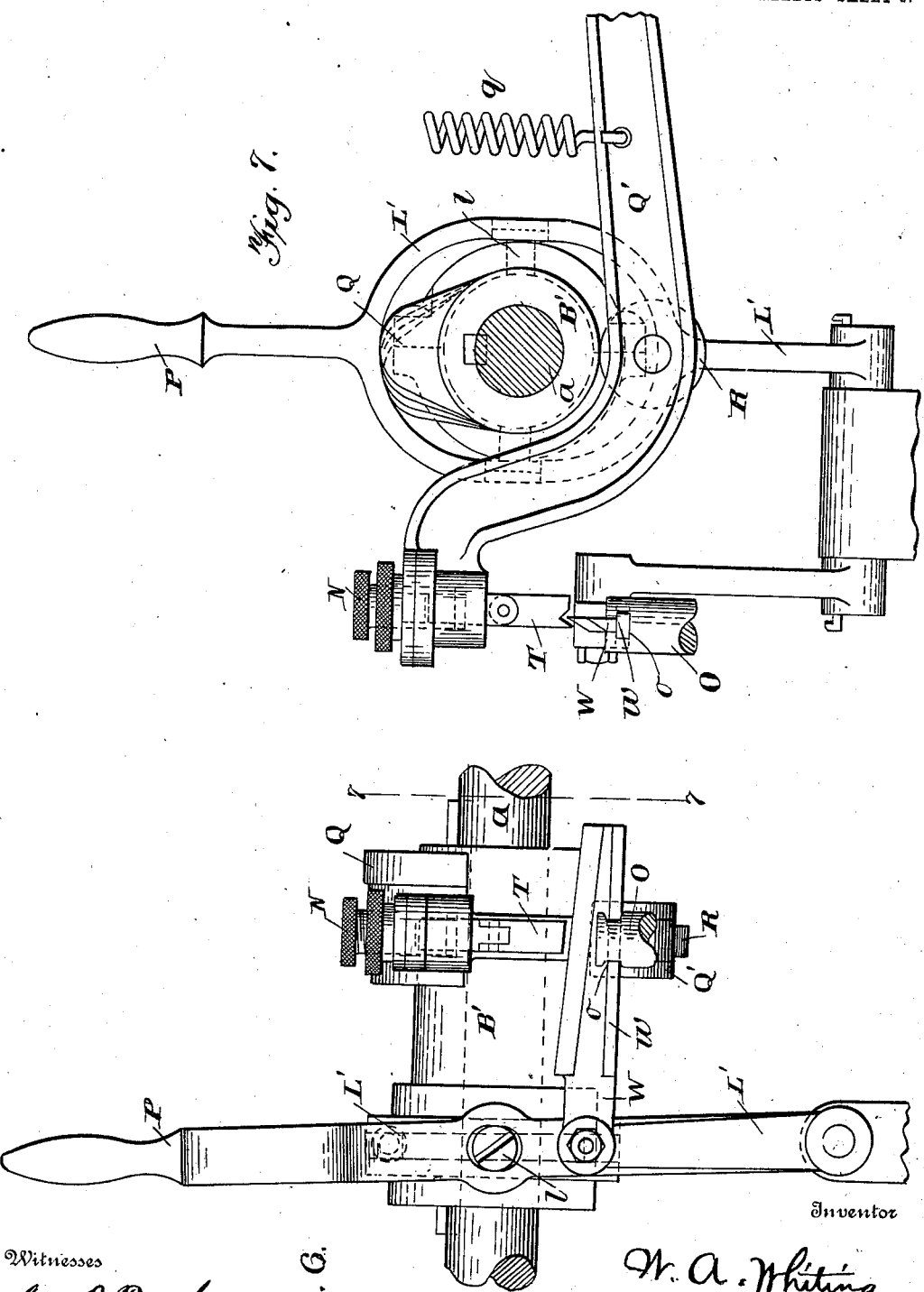
Witnesses
Geo. E. Fuch.
Chas. R. Wright Jr.
Inventor
W. A. Whiting,
By A. S. Pattison,
Attorney

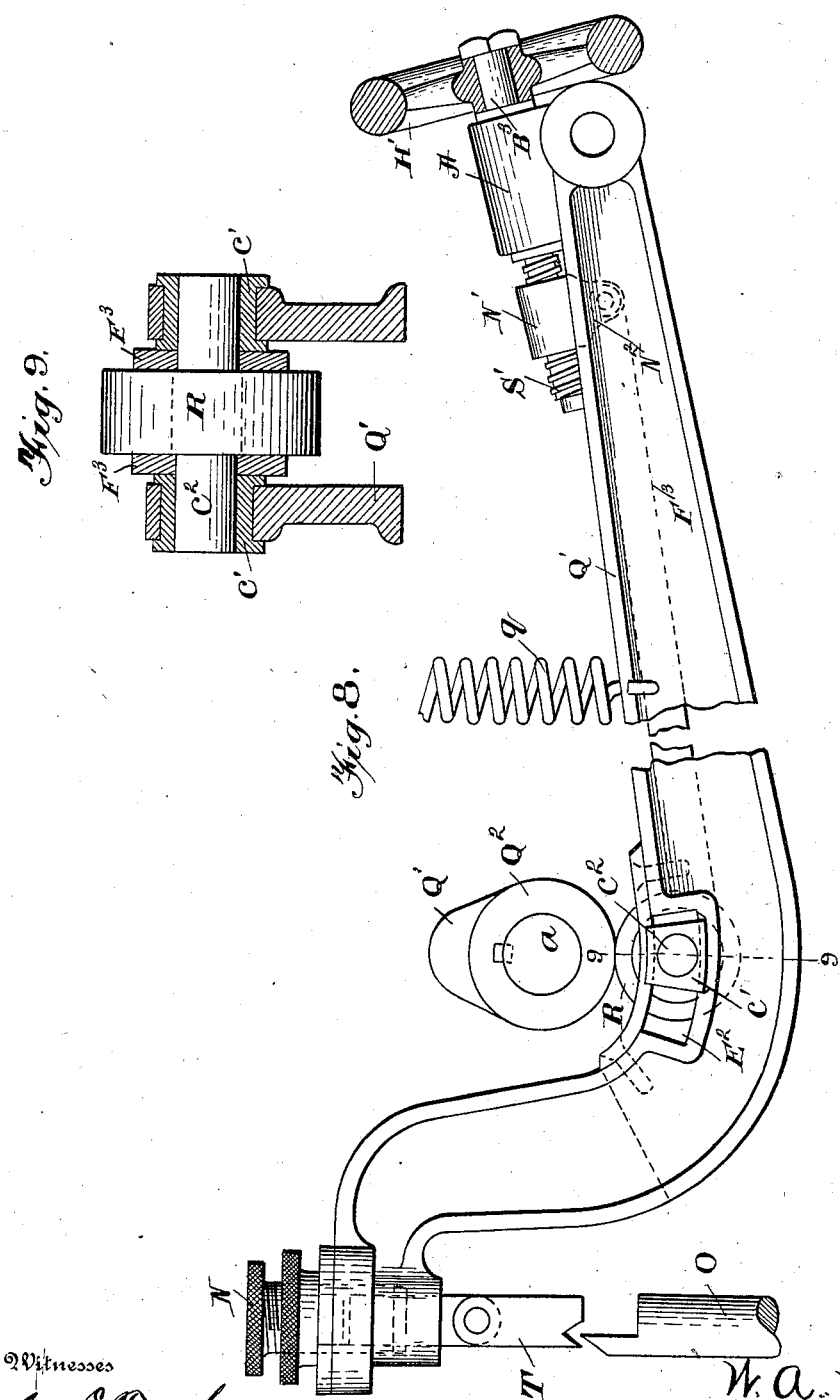

No. 725,528. PATENTED APR. 14, 1903.
W. A. WHITING.
SPEED REGULATOR FOR OIL ENGINES.
APPLICATION FILED FEB. 17, 1902.
NO MODEL. 5 SHEETS—SHEET 5.

Witnesses
Inventor
W. A. Whiting
By
A. S. Pattison
Attorney

UNITED STATES PATENT OFFICE.

WILLIAM A. WHITING, OF BURLINGTON, VERMONT.

SPEED-REGULATOR FOR OIL-ENGINES.

SPECIFICATION forming part of Letters Patent No. 725,528, dated April 14, 1903.

Application filed February 17, 1902. Serial No. 94,516. (No model.)

*To all whom it may concern:*

Be it known that I, WILLIAM A. WHITING, a citizen of the United States, residing at Burlington, in the county of Chittenden and State of Vermont, have invented new and useful Improvements in Speed-Regulators for Oil-Engines, of which the following is a specification.

My invention relates to improvements in speed-regulators for oil-engines of the type in which the oil is injected into an ignition-chamber communicating directly with the engine-cylinder, the ignition-chamber being kept hot enough to ignite the mixture of compressed air or expansion medium and oil-vapor, such ignition taking place immediately after the injection of oil and at or near the end of the compression-stroke of the engine.

The object of my invention is to provide means to regulate the speed of the oil-engine by introducing the charge at different stages of the compression-stroke, and thus increasing or decreasing the speed, as the case may be.

Another object of my invention is to provide means for varying the quantity of oil or mixture of vapor and air injected into the ignition-chamber, thus causing perfect combustion under all circumstances.

Still another object of my invention is to provide a simple, cheap, and effective device in which the means for varying the time of the injection and ignition also controls the means for varying the quantity of oil-vapor injected into the ignition-chamber.

Figure 1:
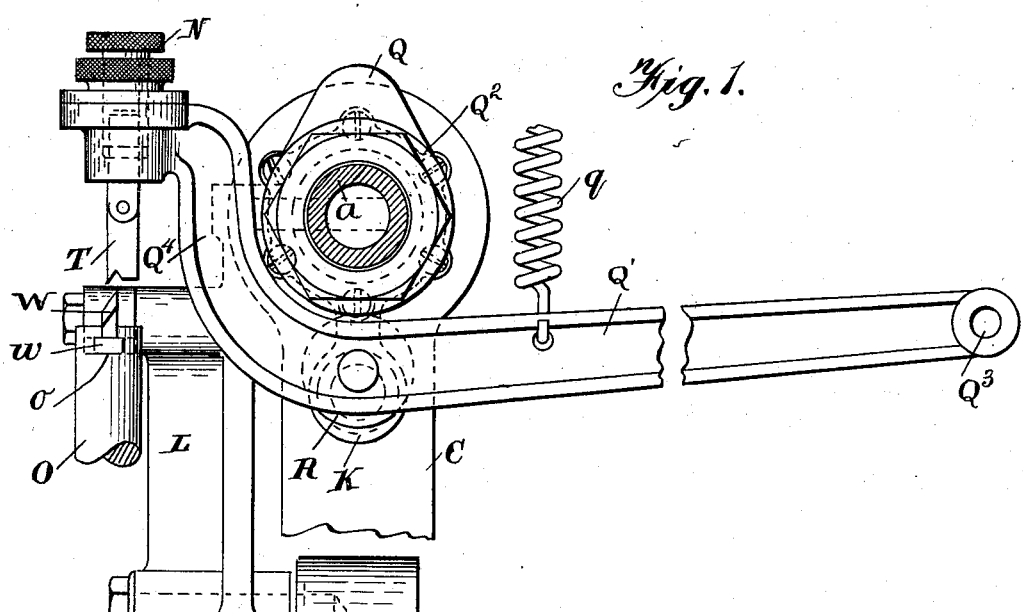
Figure 2:
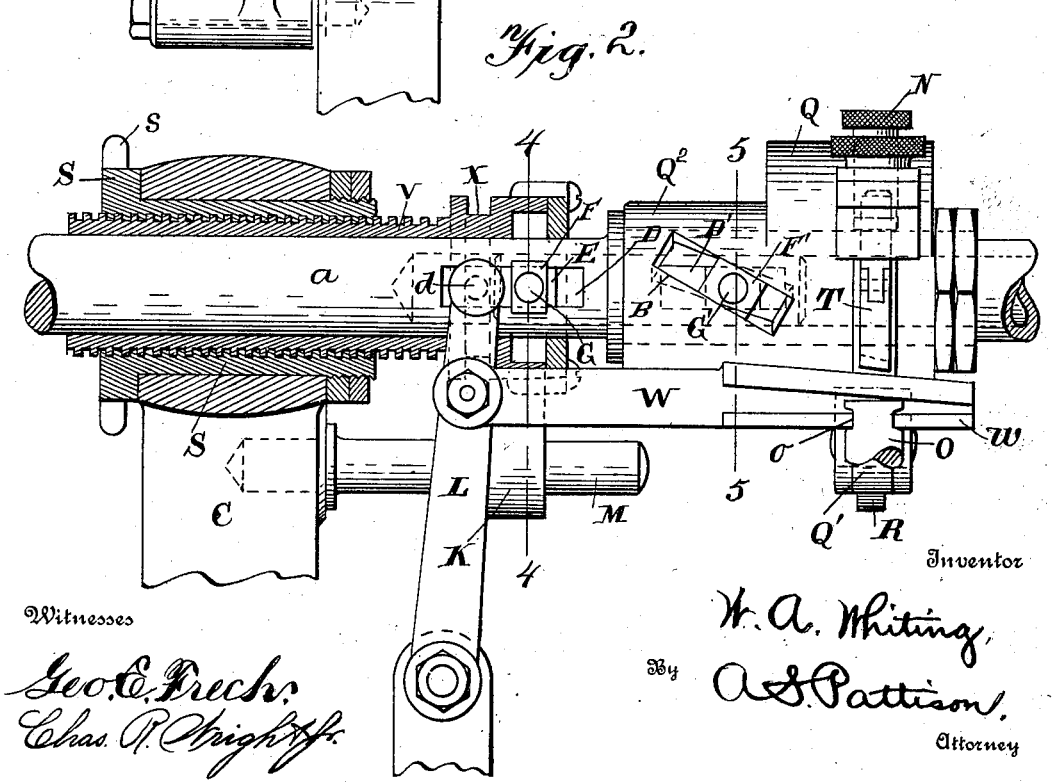
Figure 10:
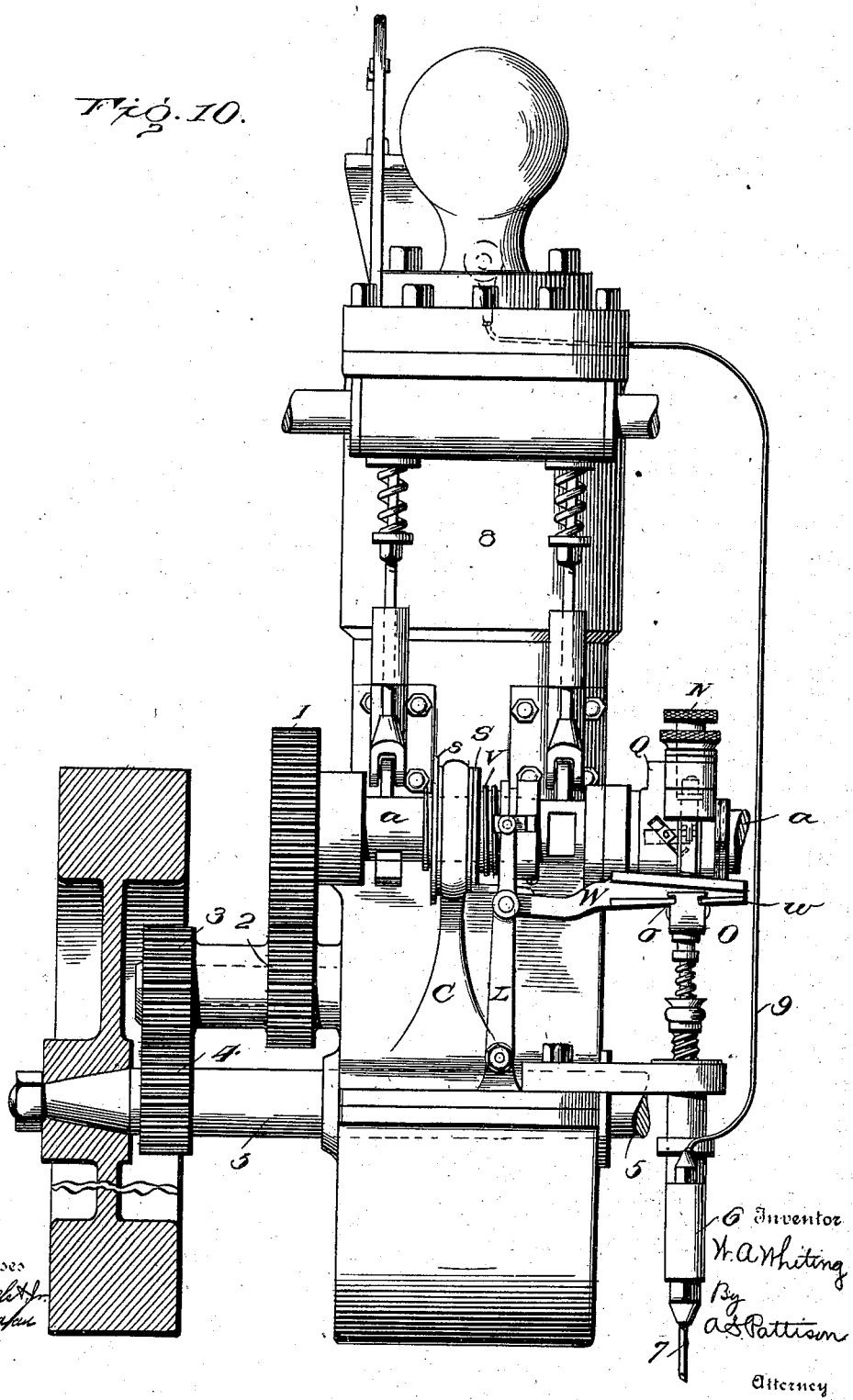

In the accompanying drawings, Figure 1 is an end view of my device, showing a portion of the oil-plunger. Fig. 2 is a side view of the same, partly in section. Fig. 3 is a horizontal longitudinal sectional view. Fig. 4 is a transverse sectional view taken on line 4 4, Fig. 2. Fig. 5 is a transverse sectional view on line 5 5 of Fig. 2. Fig. 6 is a side view of a modification. Fig. 7 is a transverse sectional view taken on line 7 7, Fig. 6. Fig. 8 is a side view of another modification. Fig. 9 is an enlarged sectional view of the cam-engaging roller shown in Fig. 8. Fig. 10 is a side view of a vertically-arranged engine, showing my device in operative connection therewith.

Referring now to the drawings, $a$ represents a hollow shaft which is geared to the power-shaft 5 of the engine through the medium of the gears 1, 2, 3, and 4 and is adapted to make one revolution to two of the power-shaft, said shaft being revolubly mounted in any desired manner.

V is a casing or sleeve which is loosely mounted on the shaft and is screw-threaded, and on said sleeve is a collar S, which is adapted to be revolved thereon and is internally screw-threaded, whereby the sleeve V is moved endwise on the shaft $a$, and said collar is adapted to be rotated by hand or by a chain passing over the sprocket $s$. The said collar S is rotatably mounted within a standard C, but is held against an endwise movement, and projecting from said standard below the shaft is a horizontal arm or stud M, extending parallel the shaft, while the sleeve V carries a downwardly-extending arm K, which is adapted to receive the arm or stud M, by means of which the sleeve is prevented from being rotated by the shaft $a$.

The outer end of the hollow shaft $a$ is provided with a sleeve $Q^2$, which is loosely mounted thereon, carrying near one end the cam Q, and beneath said shaft is a curved arm $Q'$, which has its outer end pivoted at the point $Q^3$, and intermediate the said pivotal point and the outer free end is a roller R, which is adapted to rotate and is in the path of the cam Q, carried by the shaft $a$. The said arm and the roller carried thereby are normally held up in engagement with the cam Q by a coil-spring $q$. The outer end of said arm $Q'$ is curved upward, as shown at $Q^4$, the extreme outer end carrying a vertically-arranged rod T, which is vertically adjustable therein by means of the screw-nut N. The lower end of said rod T is V-shaped and is indirectly adapted to engage the upper end of the oil or vapor plunger $o$. The lower end of said plunger $o$ works in an oil-pump cylinder 6, which has an oil-supply pipe 7 in communication therewith, and extending from said oil-pump cylinder to the upper end of the engine-cylinder 8 is a pipe 9, through which the charge is fed to the engine-cylinder 8 when the plunger $o$ is forced downwardly. The upward movement of the plunger draws a charge of oil to the pump-cylinder 6 through the supply-pipe 7.

In order to regulate the power and speed of the engine, the time at which the explosion takes place in regard to the position of the piston within the cylinder must be changed, and the greatest power is obtained when the piston is at the end of the compression-stroke.

As before stated, the shaft $a$ is hollow or provided with the opening A, and within said opening is a longitudinally-movable rod H, and adjacent the sleeve V the shaft $a$ is provided with an elongated slot D. The said rod H adjacent said slot is provided with an outwardly-extending lug G, and carried by said lug is a block E, which rests within the slot D, and a second block F is also carried by the stud or lug G and is adapted to enter the annular recess Y in the sleeve V. The sleeve being held stationary and the shaft revolving will allow the said block to travel with the recess Y, and when the sleeve is moved longitudinally upon the shaft the block E is carried forward within the opening D, and the rod H is moved within the shaft. The rod H adjacent the other end has a second stud G', which extends out through an opening D' in the shaft $a$, and the sleeve upon which the cam Q is carried also has an oblique slot B, through which the stud G' projects, and mounted on said stud and within the slot D' is a block E', and within the slot B is another block F', which will cause a slight rocking of the sleeve carrying the cam when the rod H within the shaft is moved longitudinally therein, which will necessarily cause the cam to strike the roll R sooner or later, as the case might be, thus causing the plunger $o$ to be forced down at a different time during the compression-stroke of the engine.

Mounted on the base on which the standard C is mounted is a second standard, which has pivoted to its upper end an upwardly-extending arm L, having at its upper end an inwardly-extending lug $d$, which is adapted to enter the annular recess X, carried by the sleeve V, thus allowing the sleeve to rotate, yet any endwise movement will cause the arm to be swung therewith from its pivoted point. Pivoted to said arm L is a horizontal bar W, which has its upper face gradually tapered toward its end, or, in other words, it is wedge-shaped, and has near its lower face outwardly-extending flanges $w$, which are adapted to fit in an opening $o$ in the upper edge of the plunger O, whereby it is longitudinally movable thereon, but is prevented from displacement therefrom. By this construction it will be seen that the rod T strikes said bar or wedge W and forces the plunger downward.

The operation of my device is as follows: The rotation of the collar S moves the sleeve V longitudinally on the shaft and carries the block F within the recess forward within the opening D in the shaft, which carries the rod H within the shaft forward. The block F' is moved within the oblique recess within the sleeve carrying the cam Q, which rocks the cam slightly upon the shaft, which causes the cam to engage the arm Q' at a different time, thus causing the charge to be injected into the ignition-chamber at a different time in regard to the position of the piston within the cylinder. The arm L, having lugs entering the annular recess X within the collar V, is moved with the collar, and the wedge-shaped bar W, resting upon the upper end of the plunger and connected with the collar, is also moved therewith, and such movement will cause the rod T to change the downward movement of the plunger, and thus change the quantity of the charge injected into the ignition-chamber.

Referring now to Figs. 6 and 7, I show a modification for controlling the time at which the charge is injected, using the same means and principle for varying the quantity of the charge. I employ the same arm Q', carrying the roller R, and instead of having one cam I employ four or any number, mounted side by side upon a longitudinally-movable sleeve B', which is keyed to the shaft $a$, so that it rotates therewith, yet is slidable thereon. The end of the sleeve B' carries an annular groove $c$, and the bifurcated arm L also carries lugs $l$, entering the said groove and having the upwardly-extending handle P, by means of which the sleeve is moved upon the shaft, and by so moving the sleeve any of the cams can be brought so that they will engage the roller R, said cams being arranged with their striking-surface a little in advance of the one adjacent thereto, thus changing the time at which the charge is injected, thus governing the speed of the engine. I employ the same oil-plunger and the same means for changing the quantity of the charge, which is connected to the bifurcated arm L and is operated thereby.

Referring to Figs. 8 and 9, I show still another modification employing the same principle of changing the time at which the charge is injected and at the same time changing the quantity of oil fed to the ignition-chamber. In this form I also employ the curved arm upwardly spring-held against the cam, and the outer end of said arm having the bar for forcing the oil-plunger downward and injecting the oil or vapor into the ignition-chamber. In this form I provide the arm Q' with a curved slot $E^2$, which is not concentric with the shaft $a$, and mounted in said slot are two blocks $c'$, and passing through said blocks is the bolt $c^2$, which has rotatably mounted thereon the roller R. The outer end of the arm Q' has rigidly secured thereto an upwardly-projecting arm A', which has swiveled therein the rotatable rod $B^3$, having at its outer end the wheel H', by means of which the said rod is rotated. The opposite end of the rod is screw-threaded at S', said screw-threaded portion passing through a nut N', which has its lower end $N^2$ pivoted to the bar $F^3$. The said bar $F^3$ has its outer end bifurcated and passing on each side of the roller R and receiving the bolt upon which the said roller is journaled. It will be readily seen that by turning the wheel H it moves the blocks c within the slot E² and causes the time at which the cam will engage the roller to change in regard to the position of the piston within the cylinder. At the same time the slot E² not being concentric with the shaft a it either travels to or from the cam carried thereby, thus changing the throw of the arm Q' and also changing the amount of oil forced into the ignition-chamber by the plunger, the one operation regulating both the time at which the charge is injected and the amount of oil or vapor injected.

Having thus described my invention, what I claim, and desire to secure by Letters Patent, is—

1. A speed-regulator for oil-engines, comprising an oil-plunger, means for forcing it down, means for changing the time of the said downward movement, and a movable tapered bar carried thereby and resting on said plunger, substantially as described.

2. A speed-regulator for oil-engines comprising an oil-plunger, means for forcing it down, means for changing the time of said downward movement, a tapered bar resting upon the upper end of the oil-plunger, and means connecting the said bar and the means for changing the downward movement, substantially as described.

3. A speed-regulator for oil-engines comprising a revoluble shaft, a cam carried by said shaft, an arm held in engagement with the said cam, an oil-plunger, means carried by the arm for forcing the plunger downward, and means for changing the time and distance of said downward movement, substantially as described.

4. A speed-regulator for oil-engines comprising a revoluble shaft, a cam carried thereby, an arm pivoted at one end beneath said cam, a roller carried by said arm and held in engagement with said cam, an oil-plunger, means carried by the plunger for forcing it downward, and means for changing the time and distance of said downward movement, substantially as described.

5. A speed-regulator for oil-engines comprising a revoluble shaft, a cam carried thereby, an arm held in engagement with said cam, an oil-plunger, a tapered bar carried thereby, means carried by the arm for engaging said tapered bar and forcing it downward, and means for changing the time of said downward movement, substantially as described.

6. A speed-regulator for oil-engines comprising a revoluble shaft, a cam carried thereby, an arm held in engagement with said cam, an oil-plunger, a tapered bar carried thereby, means carried by the arm for engaging said tapered bar and forcing it downward, means for changing the time of said downward movement, and means operated by said means for moving said tapered bar horizontally on said oil-plunger, substantially as described.

7. A speed-regulator for oil-engines, comprising a revoluble shaft, a cam carried thereby, an arm held in engagement with said cam, an oil-plunger, a tapered bar carried by the upper end of said plunger and in engagement with the outer end of said arm, and means for moving the cam on said shaft, substantially as described.

8. A speed-regulator for oil-engines comprising a revoluble shaft, a cam carried thereby, an arm held in engagement with said cam, an oil-plunger, a tapered bar carried by the upper end of said plunger and in engagement with the said arm, means for moving said cam on the shaft, and means operated by the said means for moving the tapered bar on the plunger, substantially as described.

9. A speed-regulator for oil-engines comprising a revoluble shaft, a cam carried thereby, an arm held in engagement with said cam, an oil-plunger beneath said arm, a pivoted lever for moving said cam on the shaft, and a tapered bar pivoted to said lever and resting upon the oil-plunger, adjacent the arm, substantially as described.

10. A speed-regulator for oil-engines comprising a revoluble shaft, a cam loosely mounted thereon, an arm held in engagement with said cam, an oil-plunger beneath said arm, a lever for rocking said cam, and a tapered bar pivoted to said lever and resting upon the upper end of said oil-plunger, substantially as described.

11. A speed-regulator for oil-engines comprising a revoluble shaft, a cam loosely mounted thereon, an arm held in engagement with said cam, an oil-plunger below said arm, a sleeve longitudinally movable on said shaft, means for moving said sleeve, and means carried by the sleeve for oscillating the cam, substantially as described.

12. A speed-regulator for oil-engines comprising a revoluble shaft, a cam loosely mounted thereon, a pivoted arm held in engagement with said cam, an oil-plunger below said arm, a sleeve longitudinally movable on the said shaft, and a tapered bar pivoted to said sleeve and resting upon the upper end of said oil-plunger, substantially as described.

13. A speed-regulator for oil-engines comprising a revoluble shaft, a cam loosely mounted thereon, a pivoted arm held in engagement with said cam, an oil-plunger in the path of said pivoted arm, a sleeve longitudinally movable thereon and externally threaded, a collar carried by said threaded portion, means for rotating said collar, and means carried by the sleeve for moving said cam, substantially as described.

14. A speed-regulator for oil-engines comprising a revoluble hollow shaft, a sleeve loosely mounted thereon and having an oblique opening therein, a cam carried by said sleeve, an arm held in engagement with said cam, an oil-plunger in the path of said arm, a rod within said hollow shaft, a pin carried by the rod and entering said oblique opening, and means for moving said rod within the shaft, substantially as described.

15. A speed-regulator for oil-engines comprising a revoluble hollow shaft having a longitudinal opening therein, a sleeve loosely mounted thereon and having an oblique opening therein, a cam carried by said sleeve, an arm held in engagement with said cam, a rod longitudinally movable within said shaft, a pin carried by the rod and passing through the opening in the shaft and the oblique opening in the sleeve, means for moving said rod within the shaft, and pivoted means for regulating the movement of said sleeve, substantially as described.

16. A speed-regulator for oil-engines comprising a revoluble hollow shaft having a longitudinal opening in one side, a sleeve loosely mounted upon the said shaft, a cam carried by said sleeve, a pivoted arm held in engagement with said arm, an oil-plunger below said arm, a rod longitudinally movable within said shaft, a pin carried by said rod and passing through the openings in the shaft and sleeve, means for moving the rod within the shaft, and a tapered bar pivoted to said means and resting upon the upper end of the oil-plunger, substantially as described.

17. A speed-regulator for oil-engines comprising a revoluble hollow shaft having a longitudinally-arranged opening in one side, a sleeve loosely mounted upon the shaft and having an oblique opening, a cam carrried by the sleeve, a pivoted arm held in engagement with said cam, an oil-plunger below said arm, a rod within said hollow shaft, a pin carried by said rod and extending through the openings in the shaft and sleeve the said shaft having a second opening, a pin carried by the rod and projecting through said opening, a sleeve surrounding the shaft and having an annular recess adapted to receive the said pin and to travel thereon, means for holding said sleeve against rotation, means for moving said sleeve longitudinally on said shaft, and a tapering bar pivoted to the said sleeve and resting upon the oil-plunger, substantially as described.

18. A speed-regulator for oil-engines comprising an oil-plunger, means for changing the downward movement of said plunger, and a tapered bar carried by the means for changing the downward movement of the plunger and resting upon the oil-plunger, substantially as described.

19. A speed-regulator for oil-engines comprising a revoluble hollow shaft having a longitudinally-arranged opening in one side, a sleeve loosely mounted upon the shaft and having an oblique opening, a cam carried by the sleeve, an arm held in engagement with said cam, an oil-plunger below said arm, a rod within said hollow shaft, a pin carried by said rod and extending through the opening in the shaft and sleeve, the said shaft having a second opening, a pin carried by the rod and projecting through said opening, a sleeve surrounding the shaft and having an annular recess adapted to receive the said pin and to travel thereon, a tapering bar pivoted to the said sleeve and resting upon the oil-plunger, and means for moving said sleeve longitudinally upon said rod, substantially as described.

20. A speed-regulator for oil-engines, comprising an oil-plunger, means for forcing it down, means for changing the time of said downward movement, and a movable tapered bar between the plunger and said means operated by said time-changing means for changing the distance of said downward movement, substantially as described.

21. A speed-regulator for oil-engines comprising a revoluble shaft, a cam carried by said shaft, an arm held in engagement with the said cam, an oil-plunger, means carried by the arm for forcing the plunger downward, means for changing the time of said downward movement, and means operated by the time-changing means for changing the distance of said downward movement of the oil-plunger, substantially as described.

22. A speed-regulator for oil-engines comprising a revoluble shaft, a cam carried thereby, an arm pivoted at one end beneath said cam, a roller carried by said arm and held in engagement with said cam, an oil-plunger, means carried by the plunger for forcing it downward, means for changing the time of said downward movement, and means carried by the time-changing means for changing the distance of said downward movement of the oil-plunger, substantially as described.

23. A speed-regulator for oil-engines, comprising a revoluble hollow shaft having a longitudinally-arranged opening in one side, a sleeve loosely mounted upon the shaft and having an oblique opening, a cam carried by the sleeve, a pivoted arm held in engagement with said cam, an oil-plunger below said cam, a rod within said hollow shaft, a pin carried by said rod and extending into the opening in the shaft and sleeve, the said shaft having a second longitudinal opening, a pin carried by the said rod and projecting through said openings, a sleeve surrounding the shaft and having an annular recess adapted to receive the outer end of said pin, means for holding said sleeve against rotation, means for moving said sleeve longitudinally on said shaft, said sleeve having a circumferential groove, a lever having its lower end pivoted and its upper end resting in said groove and a tapering bar carried by said lever and resting upon said plunger, substantially as described.

In testimony whereof I have hereunto set my hand in the presence of two subscribing witnesses.

WILLIAM A. WHITING.

Witnesses:
CHARLES E. ALLEN,
GILBERT A. DOW.